W. G. COLLINS.
WAGON-BRAKE LEVERS.
No. 194,294. Patented Aug. 21, 1877.
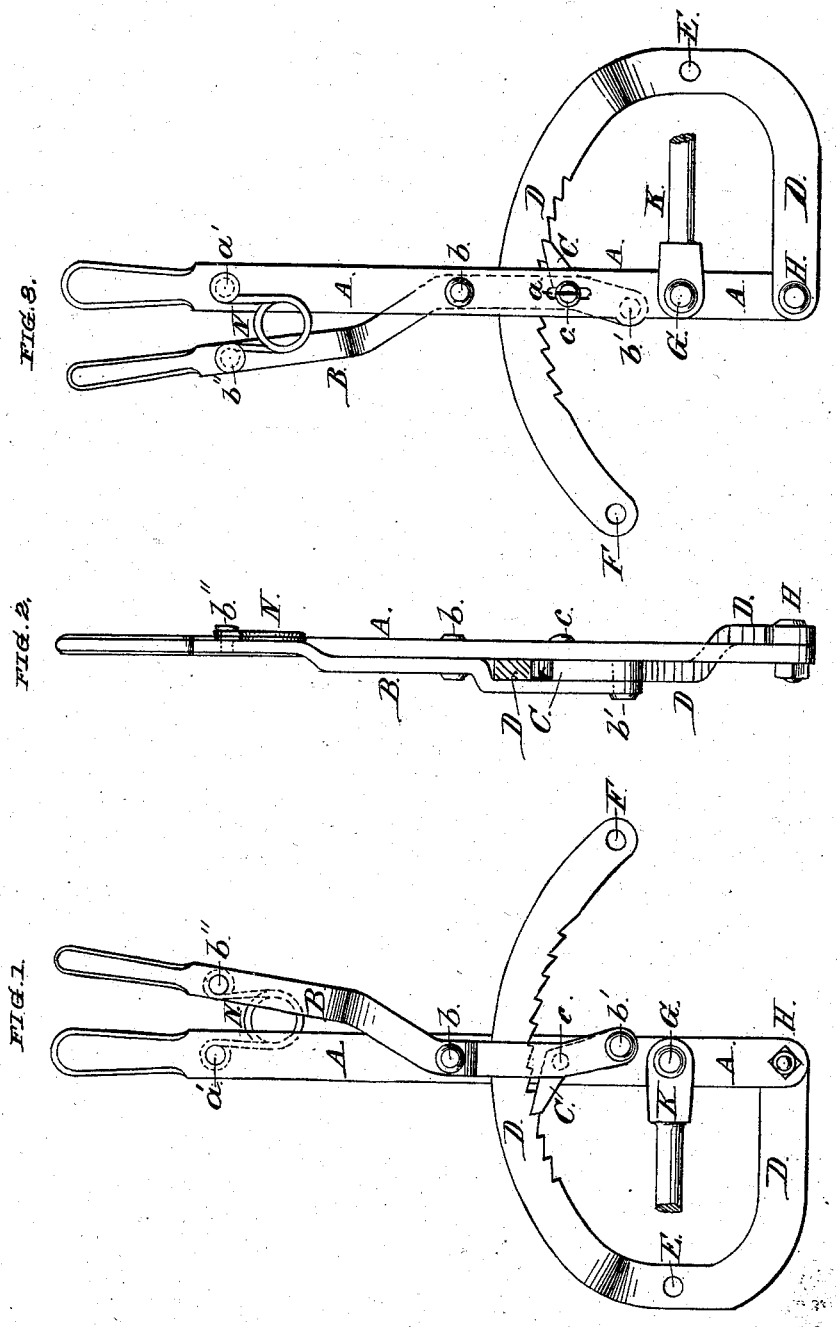
ATTEST:
INVENTOR:
William G. Collins

UNITED STATES PATENT OFFICE.

WILLIAM G. COLLINS, OF CLEVELAND, OHIO.

IMPROVEMENT IN WAGON-BRAKE LEVERS.

Specification forming part of Letters Patent No. 194,294, dated August 21, 1877; application filed July 23, 1877.

*To all whom it may concern:*

Be it known that I, WILLIAM G. COLLINS, of Cleveland, in the county of Cuyahoga and State of Ohio, have invented certain new and useful Improvements in Levers for Operating the Brakes of Vehicles, of which the following is a full, clear, and exact description, which will enable others skilled in the art to which it appertains to make and use the same, reference being had to the accompanying drawings, and the letters of reference marked thereon, which form a part of this specification, and in which—

Figure 1 is a side view of a brake-lever embodying my invention, and Fig. 2 is a front view of the same, and Fig. 3 is a back view.

Like letters of reference in the three figures refer to like parts.

The object of my invention is not only to make a good locking device for a brake, but also one that will unlock with ease, both of which I accomplish in the following manner.

A is a lever, pivoted to the wagon-box at H, and connected to the brake-rod K at G. B is a lever, pivoted to the lever A by a bolt or rivet at *b*. C is a pawl loosely connected by a rivet to the lever B at *b'*, and pivoted by the rivet *c* to the lever A, through the slot *a*, Fig. 3. D is a ratchet rigidly secured to the wagon-box in the usual way, as by bolts at E and F, and having teeth on the lower side with which the pawl C engages. N is a spring fastened to lever A at *a'*, and to the lever B at *b''*, and so set as to force the upper ends of the two levers apart.

The ratchet D is inclosed between the levers A and B by one of the levers being upon one side of the ratchet, and one on the other, this arrangement forming a guide for the levers along the ratchet back and forth.

The operation of these devices is as follows: To lock the brake, the lever A is forced forward by the operator. The pawl C is forced into engagement with the teeth of the ratchet D by the lever B, operated by the distention of the spring N in an obvious manner, and thus locking the lever A at any notch of the ratchet that is desired. To unlock the brake the upper ends of the two levers are clasped by the hand of the operator, and forced together, which causes the lower end of the lever B to move away from the lever A, and causing a partial rotation of the pawl C upon its pivot *c*, and also, as is obvious, causing the pawl to descend the lever A, the rivet *c* traveling in the slot *a*, Fig. 3. These two motions of the pawl, vertical and pivotal, disengage it from the teeth of the ratchet, and the brake is therefore unlocked.

One of the chief features of my invention is this double motion, vertical and pivotal, of the pawl C. When the pawl C is engaged with one of the teeth of the ratchet D, the point of the tooth is considerably nearer the pivot *c* than the base of the tooth is, so, if the motion of the pawl were merely pivotal, then, in order to disengage the pawl, levers would have to be forced forward considerably, as is obvious, and this is more or less difficult to do when the brake is already strained up tight. By this vertical motion the pawl is partially lowered out of the notch, as well as swung on its pivot, so that the unlocking of the brake does not require any forward thrust of the levers.

Inasmuch as the travel of the lever B is so slight at its lower end, and in order to make the vertical motion of the pawl C as much as possible, I so bend the lever B that a line drawn through the points *b c b'* shall form an obtuse angle.

Having thus fully described my invention, what I desire to secure by Letters Patent is—

In a vehicle brake-lock having the connecting-rod K and ratchet D, the combination, with the lever A, having the slot *a*, and the lever B bent in the form described and pivoted at *b*, of the pawl C, pivoted at *c* to the lever A, and connected to the lever B at *b'*, all arranged and operating substantially as and for the purposes set forth.

WILLIAM G. COLLINS.

Witnesses:
 JOSEPH R. CLARKSON,
 CORNELIUS VAN SCHOOSKY.